United States Patent [19]

Martinez

[11] 4,029,227

[45] June 14, 1977

[54] ROAD TRAILER FOR TRANSPORTING A BOAT

[75] Inventor: Jacques Martinez, Fresnes, France

[73] Assignee: Agence Nationale de Valorisation de la Recherche (ANVAR), Neuilly-sur-Seine, France

[22] Filed: Apr. 22, 1975

[21] Appl. No.: 570,473

[30] Foreign Application Priority Data

Apr. 25, 1974  France ............................ 74.14501

[52] U.S. Cl. ........................... 214/396; 280/414 B; 280/80 B

[51] Int. Cl.² .......................................... B60P 3/10

[58] Field of Search ........................... 214/394, 396; 280/414 B, 80 B, 656, 43.13, 43.16, 638

[56] References Cited

UNITED STATES PATENTS

| | | | |
|---|---|---|---|
| 2,375,754 | 5/1945 | Ballinger | 280/414 B |
| 2,448,443 | 8/1948 | Krake | 280/414 B X |
| 2,531,947 | 11/1950 | Reading | 280/414 B X |
| 2,536,563 | 1/1951 | Montgomery | 214/396 |
| 2,594,540 | 4/1952 | Cole et al. | 280/414 B X |
| 2,657,934 | 11/1953 | Linneman | 280/414 B |
| 2,738,200 | 3/1956 | De Haven | 280/656 X |

Primary Examiner—Albert J. Makay
Attorney, Agent, or Firm—Young & Thompson

[57] ABSTRACT

A trailer-type vehicle for handling, displacing and transporting a load of substantial length and especially a boat is provided with a longitudinal frame element which surrounds the load, at least one transverse frame element having a substantially arch-shaped structure which is moved into position above the load, a lifting device mounted on at least one frame element and a wheel system. Means are provided for modifying the width of the longitudinal frame element as a function of the width of the load and for displacing at least one transverse frame element with respect to the longitudinal frame element.

4 Claims, 27 Drawing Figures

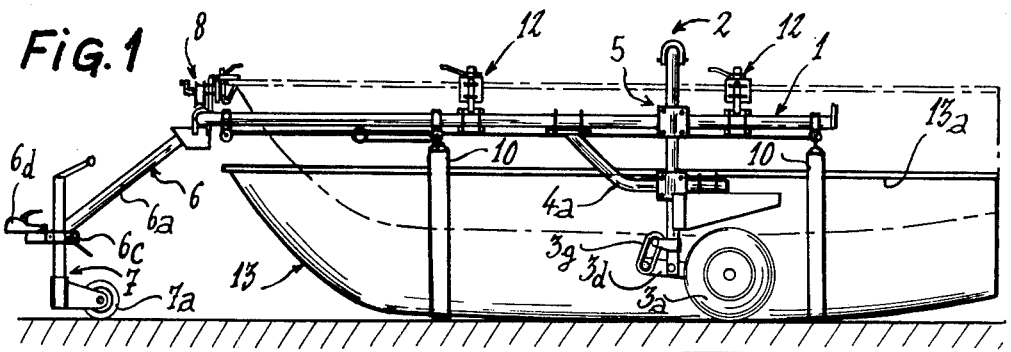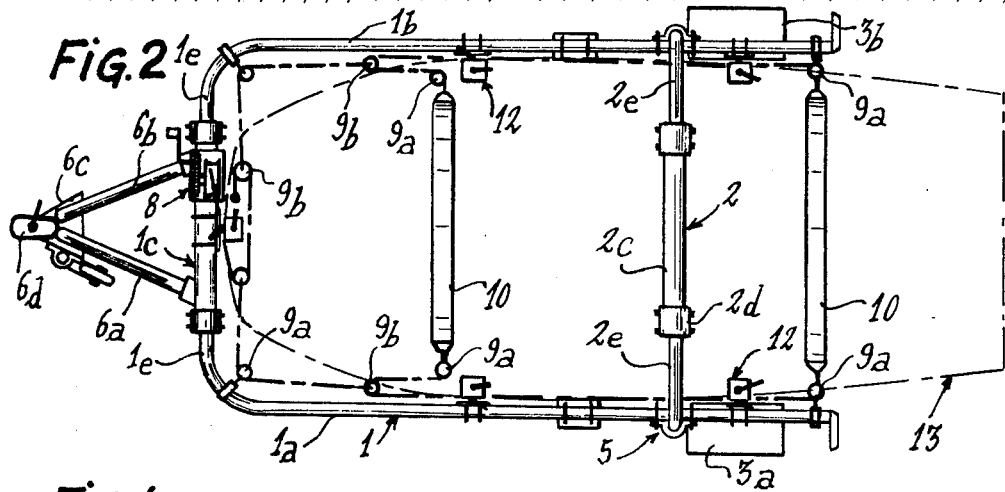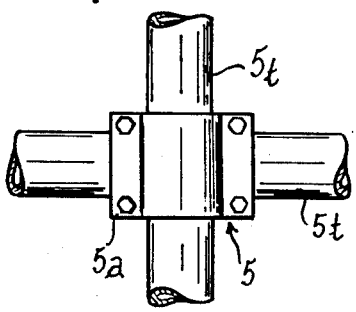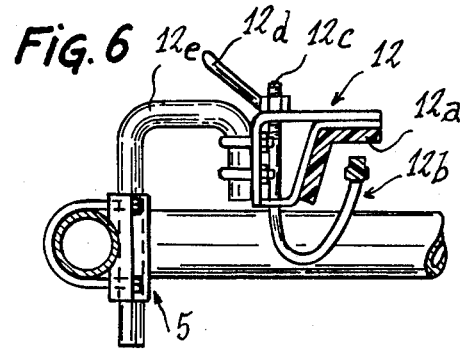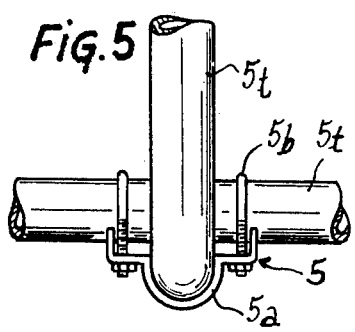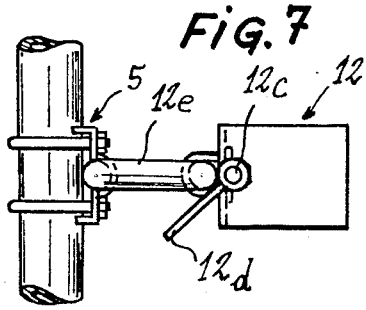

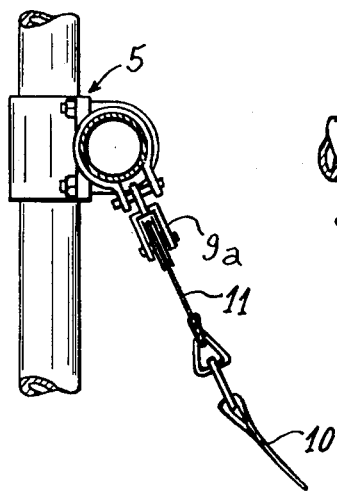
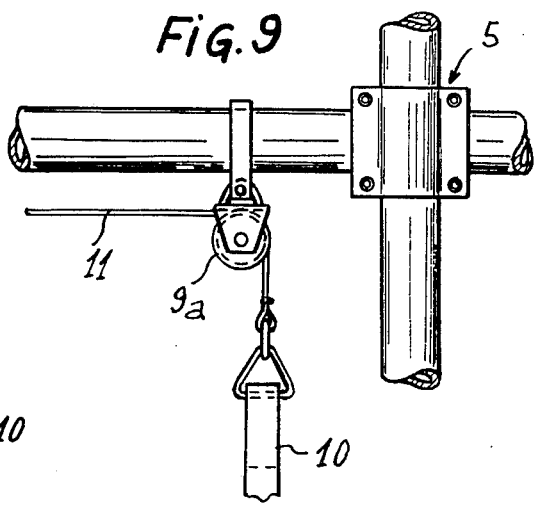
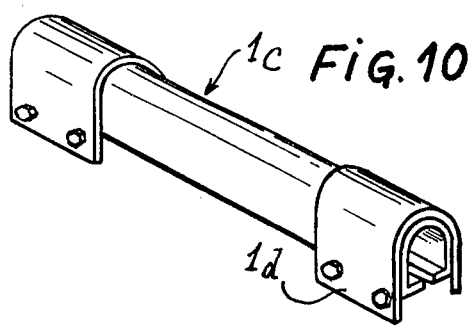
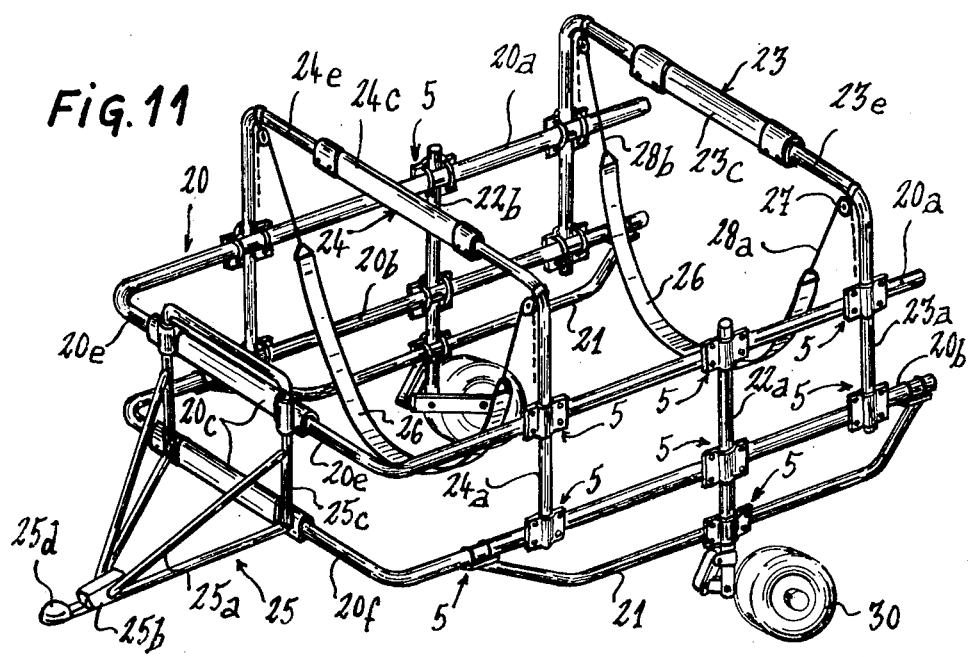

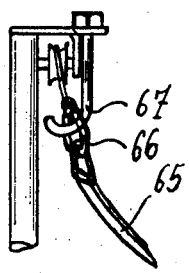
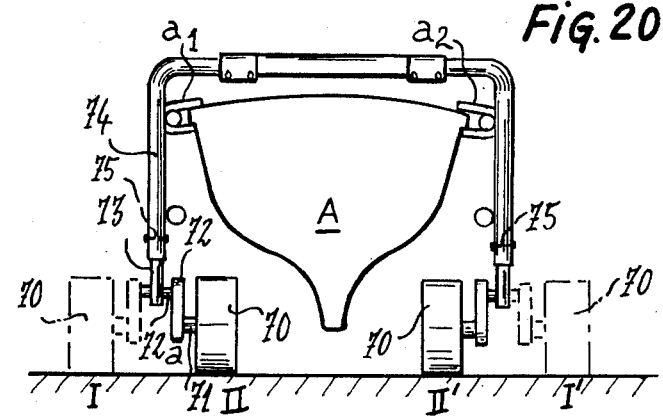
Fig. 19  Fig. 20
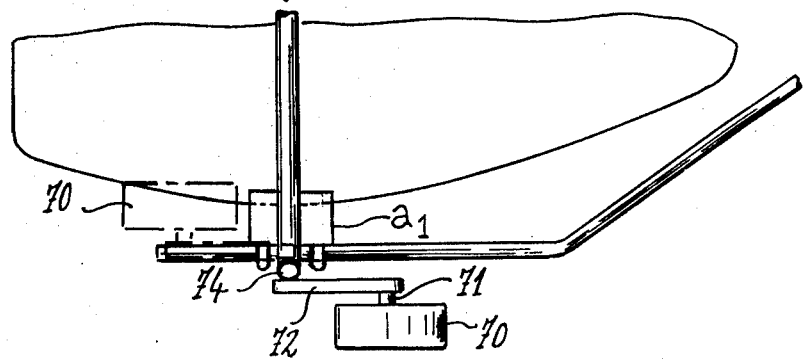
Fig. 21
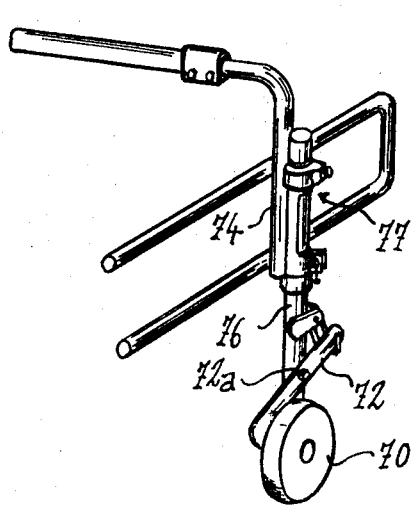
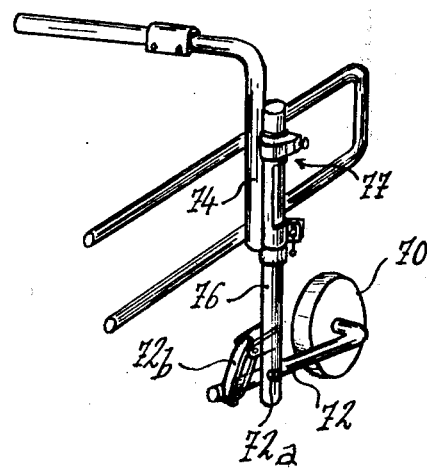
Fig. 22  Fig. 23

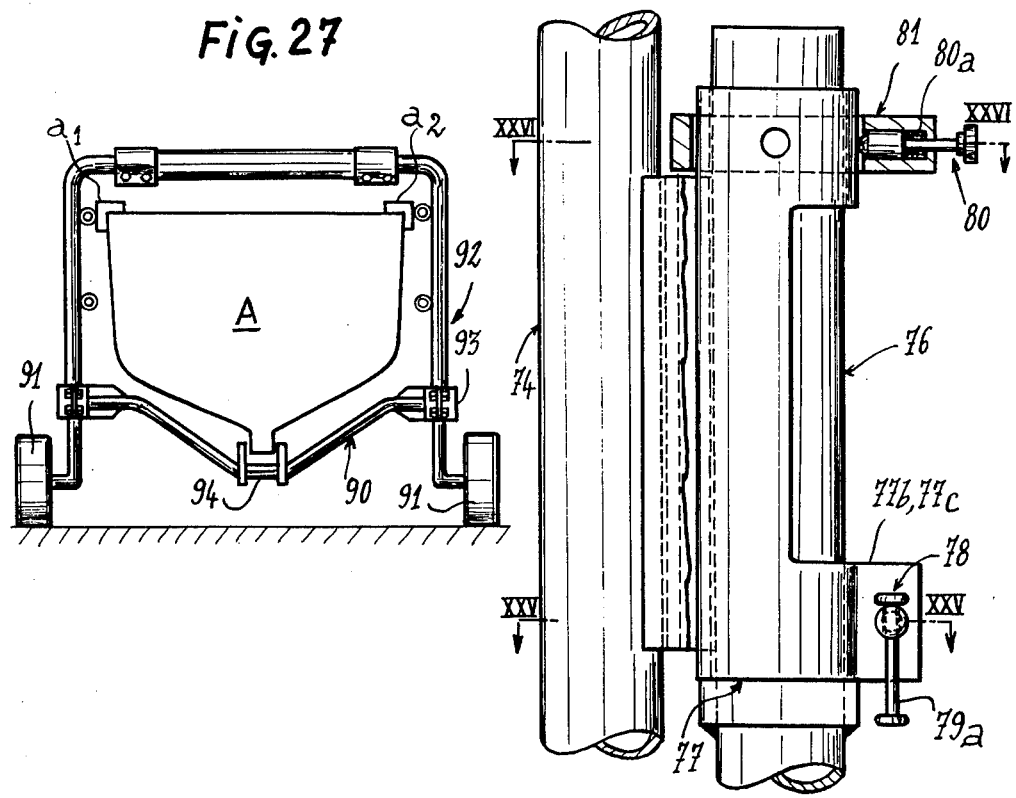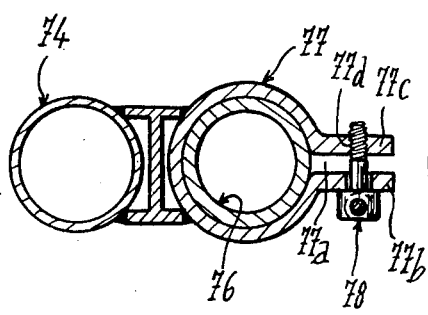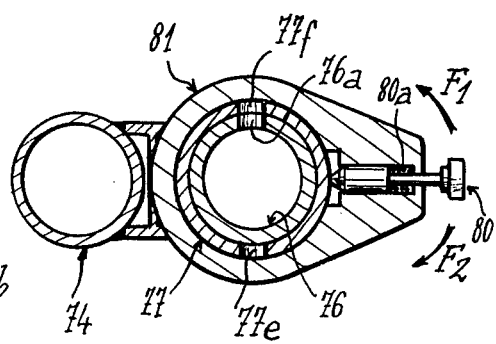

ROAD TRAILER FOR TRANSPORTING A BOAT

This invention relates to drawn vehicles intended for the road transportation of a boat or a similar load as well as to the handling, loading or unloading of said boat either on land or in the water.

In the following description, it will be understood that the word "boat" is used in its broadest sense and designates any type of water-borne craft.

Known vehicles of the most simple types which are employed for this purpose have a bottom chassis which is fitted with wheels and on which the craft is placed. Intermediate members serve to support and maintain the hull which is thus directly subjected to the stresses applied by the points of contact with these members. Vehicles of this type cannot readily be adapted to boats of different tonnages and are not equipped for easy handling.

A more lightweight version of a transporting carriage comprises a gantry system fitted with a set of wheels. The gantries pivot about the axes of the wheels, thus permitting attachment and lifting of the boat by displacement of its center of gravity ; one of the gantries can serve as a hitch system for towing the trailer. Crafts which are compatible with this type of carriage are clearly limited both in volume and in weight.

There is also known vehicles of a more highly perfected type having a frame which surrounds the top strake of the hull. Handling of the craft is possible by means of simple lifting equipment. This consits in the majority of cases of a hawser which is passed beneath the stern of the boat whilst the forward end of this latter is displaced by sliding over a fixed suspension strap, which entails the need for a tilting movement of the frame.

In order to make provision for boats of larger size, drawn vehicles of the gantry type have been designed with a longitudinal main beam which serves as a reinforcement for a bottom frame which surrounds the boat. Means for attaching and lifting by making use of hawsers permit handling of the boat in water or on land as well as wedging of the boat for transporation.

Since the top main beam is intended to withstand all the stresses whilst the frame serves in most instances only to provide lateral protection of the boat, this beam must have substantial dimensions and is accordingly liable to increase the weight of the structure and to entail the need for a tractor unit of suitable power.

It is clearly possible to reduce the weight of the main beam but this is attended by a disadvantage in that a limitation is also set on the volume and weight of the craft.

Another alternative design of vehicle consists in adopting a unitary construction which is both self-supporting and non-deformable under the load of the boat. A construction of this type is of lighter weight but creates problems of adjustment since a unitary structure is designed for balanced distribution of stresses.

The forms of construction which are thus known at the present time are subject in particular to the following disadvantages :

the lack of means for adapting the spacing of the set of wheels to the width of the boat and to the width of roads;

the fact that there is no possibility of adjusting the height of the frame elements with respect to the height of the boat;

the fact that there is no possibility of adjusting the position of the set of wheels with respect to a longitudinal element of the frame for the purpose of distributing the masses of the boat with respect to the axis of the set of wheels;

the presence of objectionable top structures which interfere with the superstructures of the craft, especially in the case of craft provided with masts such as sailing boats;

more generally the fact that, above a low tonnage, it is necessary in practice to provide a particular type of trailer for each type of boat it it is desired to retain a trailer having a structure of the gantry type, thus preventing manufacture on a large scale.

The aim of the present invention is to overcome the various disadvantages which have been outlined in the foregoing.

This invention relates to a vehicle of the road trailer type for handling displacing and transporting a load of substantial length and especially a boat, said vehicle being characterized in that it comprises :

means for modifying the width of the longitudinal frame element as a function of the width of the load, means for displacing at least one transverse frame element with respect to the longitudinal frame element.

By virtue of these different degrees of freedom, the contour of the trailer can readily be adapted to that of the boat to be transported.

Within the scope of the preceding embodiment, the wheels of the wheel system can be carried either by the transverse frame element or by the longitudinal frame element.

In a preferred embodiment, the longitudinal frame element comprises two side members adjustably connected at the forward end by means of at least one cross-member and also connected by means of at least one arch which is adjustable both in width and in length.

In another embodiment, the longitudinal frame element is constituted by two pairs of parallel and opposite side members adjustably connected at the forward end by means of at least one pair of cross-members and also connected by means of at least two arches which are adjustable both in width and in length.

The invention is also concerned with an embodiment which permits folding of the vehicle. In this case, the longitudinal frame element comprises two opposite side-member assemblies connected together by adjustable articulation means on a drawbar hitch mounting of the vehicle, the transverse frame element which carries the wheels of the wheel system being adjustable in width so as to modify the angular distance of the side-member assemblies and being separable so as to permit the relative inward displacement of said assemblies when no load is being carried.

Another particularly advantageous embodiment permits modification of the wheel spacing in order to adapt the wheels to the transverse cross-section of the boat and to the width of the roadway. This embodiment is characterized in that provision is made in the case of each wheel for a pivot-pinwhich rotates through an angle of 180° in a bearing rigidly fixed to said frame element so as to obtain two symmetrical positions of the axle and of its wheel which can accordingly be directed either outwards or inwards with respect to the vehicle.

In a preferred embodiment of the invention, the boat is secured by means of a set of support brackets distributed along the longitudinal frame element as a function of the contour of the top portion of the load and in such a manner as to ensure that said load is maintained in the raised position both in the longitudinal and transverse direction.

Further properties and advantages of the invention will become apparent from the following detailed description, a number of different embodiments of the invention being illustrated in the accompanying drawings which are given by way of example without any limitation being implied, and in which:

FIG. 1 is a view in side elevation showing a first embodiment of a vehicle in accordance with the invention;

FIG. 2 is a plan view of the embodiment shown in FIG. 1;

FIGS. 4 and 5 are views in elevation and in plan showing constructional details of the vehicle in accordance with the invention;

FIGS. 6 and 7 are detail views in elevation and in plan showing the method adopted for securing the load on the vehicle;

FIGS. 8 and 9 are further detail views in elevation showing the method adopted for lifting the load;

FIG. 10 is a detail view in perspective showing part of the transverse frame;

FIG. 11 is a view in perspective showing a second embodiment of the invention;

FIG. 19 is a detail view which illustrates the method adopted for locking the lifting means;

FIG. 20 is a transverse sectional view which illustrates the two possibilities provided for varying the track-width or spacing of the vehicle wheels;

FIG. 21 is a partial plan view of FIG. 20;

FIG. 22 and 23 are partial views in perspective showing one mode of assembly and positioning of the wheels;

FIGS. 24 to 26 are views in elevation and in cross-section showing constructional details of FIGS. 22 and 23;

FIG. 27 is a transverse sectional view illustrating a means for reinforcing the vehicle of FIG. 20.

Figure 3:
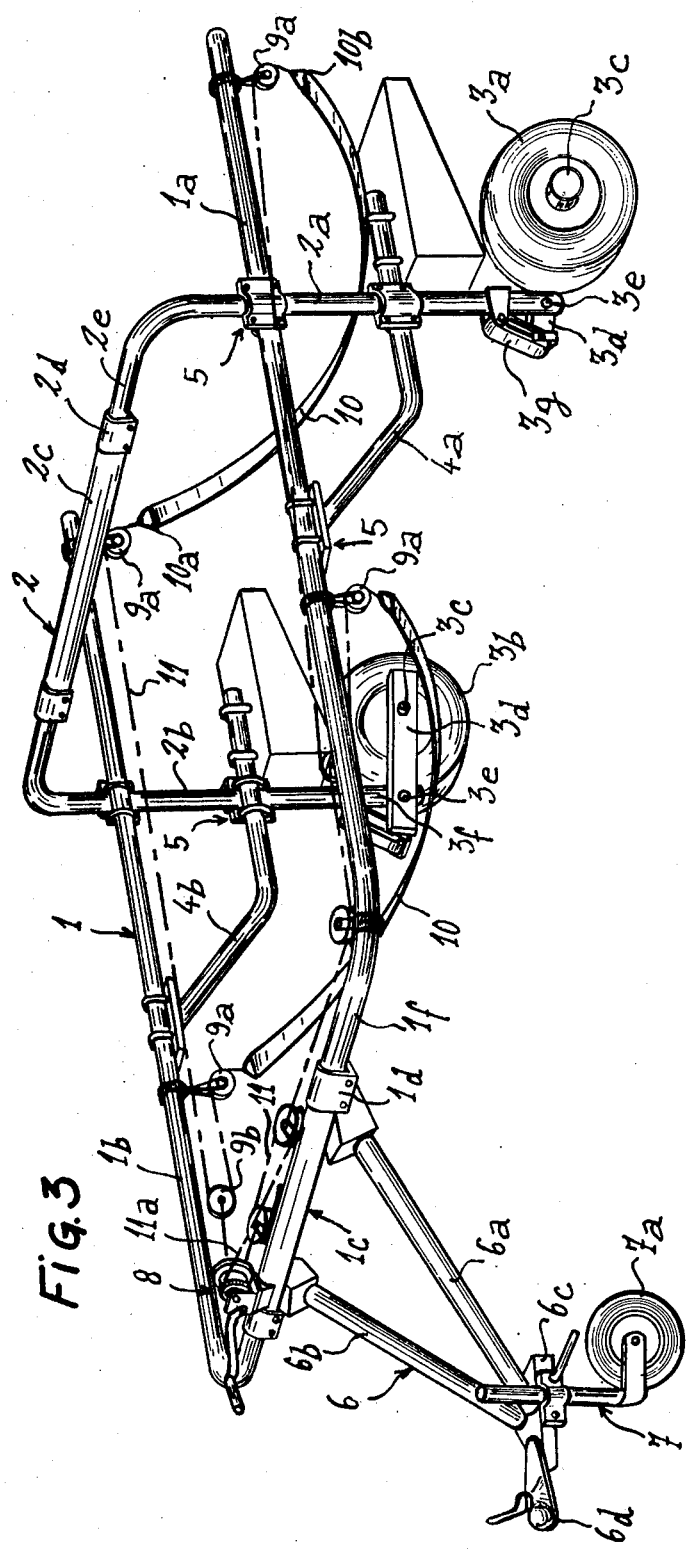
FIG. 3 is a view in perspective corresponding to FIGS. 1 and 2.

In the particular embodiment of the invention which is shown in FIGS. 1, 2 and 3, the vehicle comprises a frame 1 made up of two side members 1a, 1b, of the tubular type, for example, connected to each other by means of a front cross-member 1c and a transverse arch 2 extended by upright members 2a, 2b, which carry the set of wheels 3a, 3b. Strengthening elements 4a, 4b connected to the side members 1a, 1b and to the upright members 2a, 2b ensure rigidity of the structural connections 5 in all planes.

As shown in FIGS. 4 and 5, the structural connections 5 are of the conventional clamp type comprising shaped plates 5a and straps 5b which closely conform to the shape of the tubes 1d constituting the longitudinal and transverse frame elements.

The frame 1 is extensible in width on the one hand by virtue of the forward cross-member 1c and the cross-member 2c (arch 2) which are provided with strap-type clamping means 1d (see FIG. 10) and 2d and on the other hand by virtue of the transverse inner bearing portions 1e which terminate the side members 1a, 1b at the forward end or inner bearing portions 2e which form extensions of the upright members 2a, 2b.

The straight inner bearing portions just mentioned are connected respectively to the side members or to the upright members by means of elbows which can readily be formed by bending but there would be no objection to forming right-angled junctions between these latter.

The position of the wheel system with respect to the frame can be modified by displacing the structural connections 5 along the side members 1a, 1b.

The wheels 3a, 3b are mounted on an overhung axle 3c and at the extremity of a crank-arm 3d which is pivotally mounted on a pin 3e, said pin being secured to a pivot 3f. The other extremity of the crank-arm 3d is connected to a resilient damping element 3g such as a rubber link for example, said link being in turn connected to the pivot which is keyed in the upright member 2a 2b.

The frame 1 is completed by a drawbar unit or hitch system 6 which in turn, in the example under consideration, is constituted by two tubular rods 6a, 6b disposed in a triangle. The rods which form the basic angular interval or width-setting are attached to the forward cross-member 1c and connected together at the vertex by means of a plate 6c fitted with a coupling shackle or hook 6d. The plate 6e also serves as a support for a leg 7 which can be fitted with a wheel 7a.

A hand winch 8 is mounted on the forward cross-member 1c. Pulleys 9a and pulley-blocks 9b are disposed at intervals along the side members 1a, 1b. At least two transverse suspension straps 10 disposed in one case at the rear and in the other case in an intermediate position are connected at their extremities 10a, 10b to cables 11 which pass over pulleys 9a and the pulley-blocks 9b so as to reduce the effort transmitted by the length of cable 11a which is wound onto the drum of the winch 8.

Support brackets 12 having an obtuse-angle profile (as shown in FIGS. 1, 2 and 6, 7) are disposed at intervals along the side members 1a, 1b in order to wedge the boat in the raised position for transportation. The support brackets 12 are each fitted with an elastic stop 12a. Securing of the boat on the support brackets 12 is carried out by means of pivotal goosenecks 12b which can comprise a threaded rod 12c and a wing-nut 12d.

The support brackets 12 and the extremities of the goosenecks 12b form a jaw which is capable of gripping the edge of the boat.

The operation of the embodiment illustrated in FIGS. 1 to 3 is as follows: the vehicle frame 1 is placed above the boat 13, the suspension straps 10 having previously been lowered by the cables which are operated from the winch 8. The straps 10 are passed beneath the hull and the winch 8 is actuated so as to move this latter upwards until the top edge or gunwale 13a is wedged on the support brackets 12.

At this moment, the goosenecks 12b which have previously been unscrewed and moved to one side are turned back beneath the gunwale 13a, whereupon the wing nuts 12d are screwed-down in order to produce a powerful clamping action which has the effect of securing the hull to the frame 1.

The main advantages of the form of construction described in the foregoing are as follows:

the width of the frame is adapted to the width of the boat by modifying the introduction of the inner bearing sections 1e and 2e within their respective cross-members 1c and 2, this being readily obtained by slackening-off and then retightening the clamps 1d (shown in FIG. 10 and 2d), balancing of the masses of the boat 13 with respect to the wheels 3a, 3b is carried out by displacing the upright members 2a, 2b and their strengthening elements 4a, 4b along the longitudinal frame element, that is to say along the side members 1a, 1b. This balancing action is very important in order to maintain road adherence of a tractor vehicle such as a passenger car, the height of the frame can be adapted with respect to the ground by modifying the positions of the upright members 2a, 2b on the side members 1a, 1b in a vertical direction. This makes it possible to receive boats having different depths of hull or to modify the free height of the base of the hull above ground in accordance with requirements.

FIG. 11 illustrates another embodiment of the invention which constitutes an alternative form of FIG. 3. In this figure, a frame 20 comprises two pairs of two side members 20a, 20b which are connected together respectively by means of a pair of cross-members 20c as well as two arches 23 and 24. Strengthening side members 21 are disposed parallel to the side members 20a, 20b and connected to these latter as well as to the upright members 22a, 22b by means of clamp connections 5 which have already been described with reference to FIGS. 4 and 5. The cross-members and the arches are adjustable in the direction of the width of the frame 20 as has already been described earlier with reference to FIG. 10 in the case similar cross-members. The arches 23 and 24 are adjustable along the pairs of side members 20a, 20b and 21.

All the adjustments are carried out by means of clamp connections 5.

Upright members 22a, 22b which are each fitted with a wheel 30 are placed between the arches 23 and 24 and secured to the side members by means of clamp connections 5.

The frame 20 can be extended in width by modifying the extent of penetration of the inner bearing sections 20e within the forward cross-members 20c and also by modifying the extent of penetration of the inner bearing sections 23e, 24e within the cross-members 23c, 24c of the arches 23 and 24. Said cross-members are constructed in the manner described with reference to FIG. 11. The arches 23 and 24 are secured to the frame by means of upright members 23a 24a.

The position of the wheel system 30 with respect to the frame 20 can be adapted by displacing the clamp connections 5 of the upright members 22a, 22b along the corresponding side members.

A drawbar or hitch system 25 is formed by four tubular 25a which are disposed along the edges of a pyramid or in other words joined together at one end on a common gusset-plate 25b and arranged in spaced relation at the other end on a frame 25c which also serves to brace the forward cross-members 20c.

The gusset-plate 25b is fitted with a coupling shackle or hook 25d.

The arches 23 and 24 are independently adjustable both in position and in height along the frame 20 in order to permit the maximum hull depth. To this end, the suspension straps 26 are controlled by means of pulleys 27 fixed on the arches 23, 24. A winch (not shown in the figure) which is identical with the winch provided in the embodiment of FIG. 3 and placed on the forwad cross-member 20c controls the suspension straps 26 by means of cables 28a, 28b and pulley-blocks (not shown in the figure) under the same conditions of operation as in the previous embodiment.

Among the advantages of the embodiment shown in FIG. 11 can be mentioned the ease of adaptation of the arches to the superstructures, the greater permissible height above ground and the reinforced structure of the frame 1 which is compatible with a boat of greater weight.

Figure 12:
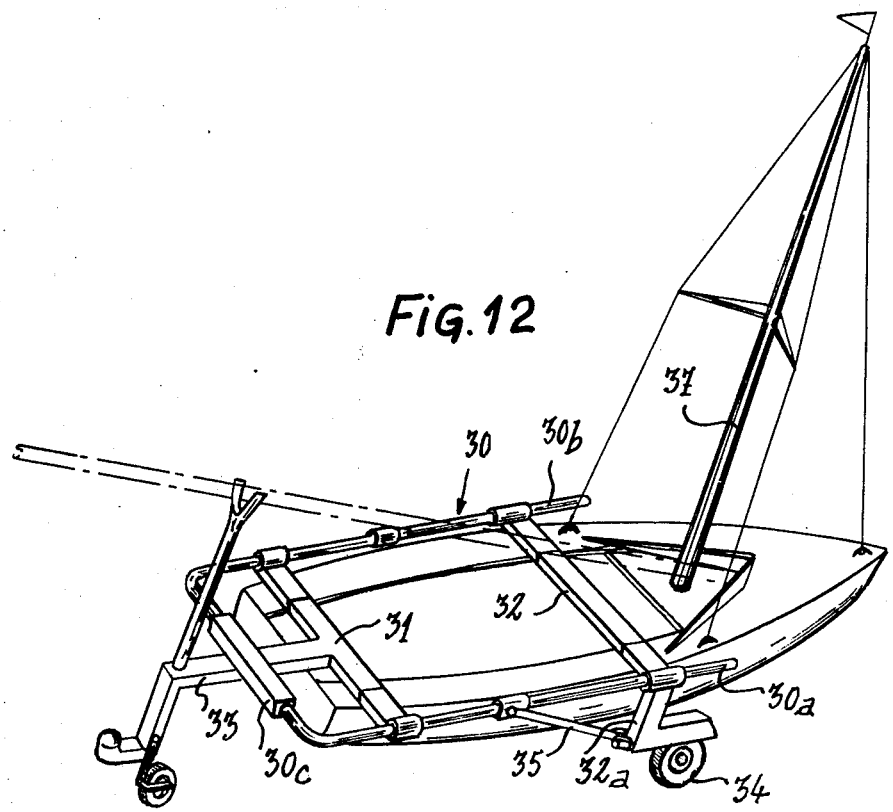
FIG. 12 is a view in perspective showing another embodiment of the invention.

In the embodiment of FIG. 12, the frame 30 comprises two side members 30a, 30b connected together by means of a forward cross-member 30c as well as two other independent cross-members 31 and 32, the cross-member 31 being connected to the drawbar 33.

The rear cross-member 32 which is independent has an extension in the form of upright members 32a which carry respectively the wheels 34 of the wheel system. Struts 35 join the side members 30a, 30b to the extremity of each upright member 32a.

The cross-members shown diagrammatically in FIG. 12 are adjustable both in position and in the direction of the width of the frame 30 by means of clamp connections of the type described with reference to FIGS. 4 and 5.

The position of the struts 35 on the side members 30a, 30b is adjustable under the same conditions.

Figure 13:
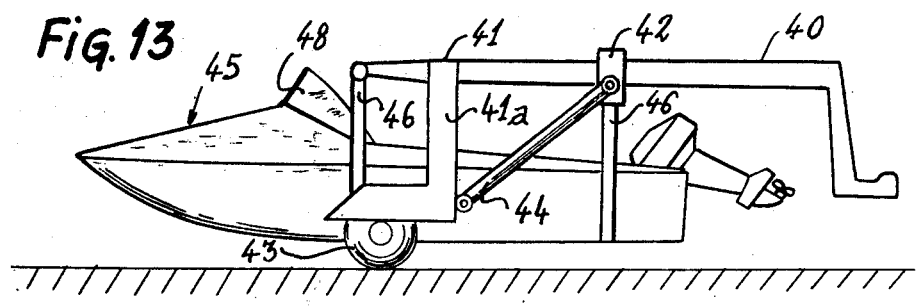
FIG. 13 is a side view of an alternative embodiment.
Figure 14:
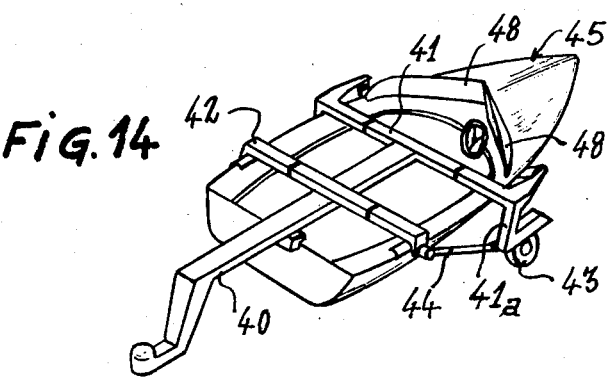
FIG. 14 is a view in perspective showing the same alternative embodiment as in FIG. 13.

The alternative form of construction shown in FIGS. 13 and 14 comprises a drawbar 40 rigidly fixed to a rear cross-member 41 and a removable cross-member 42. The cross-member 41 comprises upright members 41a terminating in wheels 43.

The cross-members 41 and 42 are adjustable in the direction of the width of the boat 45; the forward cross-member 42 is adjustable in the longitudinal direction with respect to the drawbar 40. Struts 44 ensure rigidly of the assembly.

In the embodiments illustrated in FIGS. 12 and 13, 14, the frame elements can be assembled by means of clamps of the type shown in FIGS. 4 and 5.

The lifting elements such as winch, cables, pulley-blocks, suspension straps (46) are not shown in these figures but are identical with those mentioned in reference to the preceding embodiments.

The vehicles of FIGS. 12 and 13, 14 permit easier transportation of boats having cumbersome and/or delicate superstructures which must be maintained at a distance from the frame. This may involve a mast 37 (shown in FIG. 12) or a windshield 48 (shown in FIGS. 13, 14). In this case, the structural design of the frame permits back-to-front reversal of the boat in order to provide a clearance between said superstructures and the drawbar or cross-members.

Figure 15:
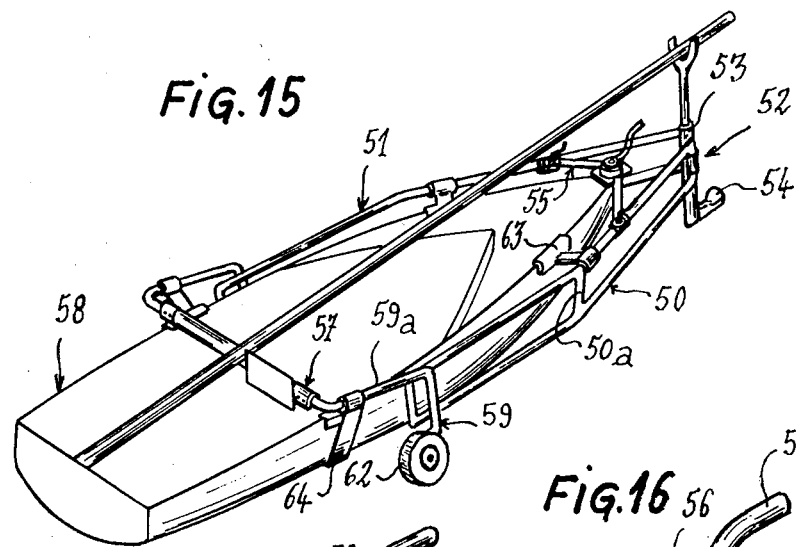
FIG. 15 is a view in perspective showing a further embodiment in which provision is made for folding the vehicle.

Another embodiment which is particularly advantageous by virtue of its folding design is shown diagramatically in FIG. 15. This embodiment comprises a frame formed by two opposite assemblies 50 and 51 of side members strengthened by upright members 50a and connected together by means of hinge units 52 rigidly fixed to a drawbar hitch mounting 53 which is intended to receive a hitch element 54.

Figure 16:
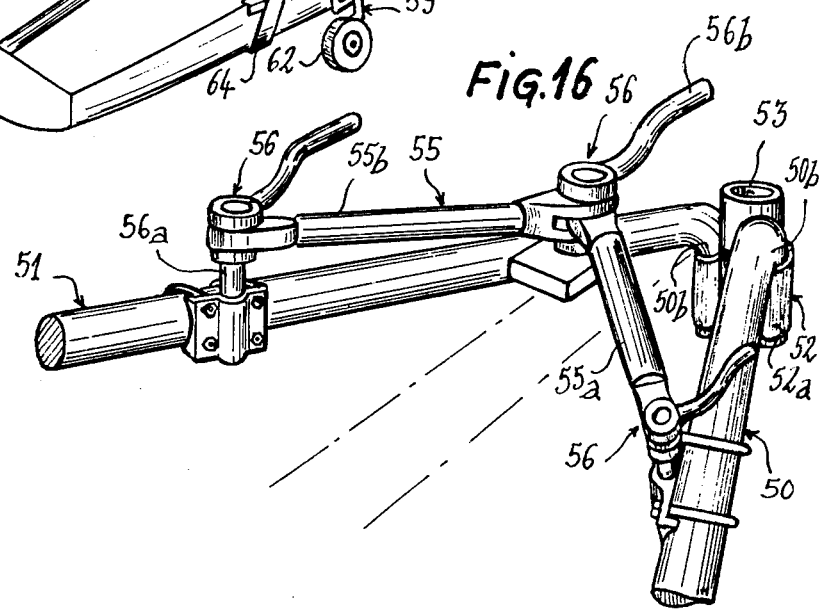
FIG. 16 is a view in perspective to a larger scale and showing part of the construction of FIG. 15.

The hinge units shown in detail in FIG. 16 are formed by sockets 52a which are fixed on the mounting 53 and in which are pivotally mounted the inner bearing sections 50b formed by the elbowed extremities of the assemblies 50 and 51.

A toggle system 55 constituted by two equal arms 55a and 55b connected to the assemblies 50, 51 in proximity to the hinge units 52 comprises articulations 56 which are each tigthened by means of a threaded pin 56a and a lever-nut 56b. Said toggle system serves to establish the angular divergence of the two assemblies 50, 51 as a function of the width of the boat 58 or to maintain said assemblies in the folded position (as shown in FIG. 17).

The rear end of the frame is provided with a cross-member 57 which is fitted on inner bearing sections 57a and 57b forming an elbowed portion between these latter. The inner bearing section 57b is intended to engage within another elbowed extension 59a corresponding to an upright member 59 which is secured to the frame. The extent of penetration of the inner bearing sections 57a within the cross-member 57 completes the width adjustment of the vehicle and has a contributory effect in reinforcing the frame.

The elbowed bearing section 57b and the elbowed extension 59a prevent the upright member 59 from rotating within its clamps 5 under the action of the vertical stub member 60 to which said upright member is rigidly fixed and which carries the crank-arm 61 fitted with a wheel 62. The wheels are thus always maintained in parallel alignment.

Figure 17:
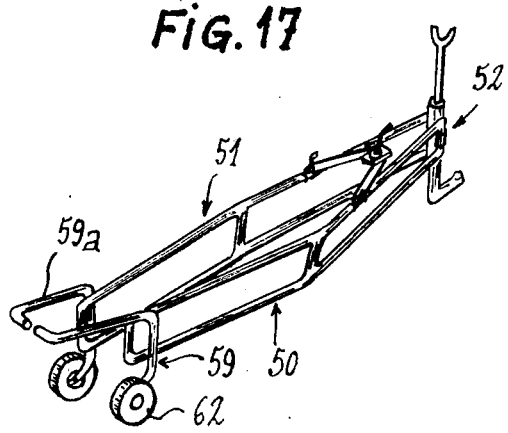
FIG. 17 is a view in perspective showing the vehicle of FIG. 15 in the folded position.
Figure 18:
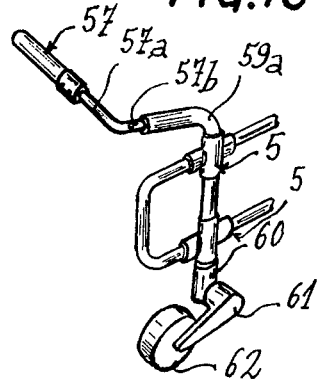
FIG. 18 is a view in perspective showing a part of FIG. 15.

The assemblies 50, 51 can be folded by disassembling the cross-member 57 after slackening-off the toggle system 55 (as shown in FIG. 17). These elements can also be connected together by means of a sleeve (not shown in the figure) which ensures parallel alignment of the wheels under the same conditions as the cross-member 57. The cross-member 57 employed can advantageously be of the type shown in FIG. 10. All the assemblies are likewise erected by means of clamps which are similar in design to the clamp connection shown in FIGS. 4 and 5.

Supports 63 and at least one suspension strap 64 serve to lift the boat 58 and to secure it for transportation.

The vehicle of FIGS. 15 to 18 offers an advantage in that it can be folded and that substantial clearance can be provided for cumbersome superstructures.

It will be noted that, in all embodiments of the present invention, provision can be made for additional fastening of the boat by attaching the suspension straps 65, for example (as shown in FIG. 19) in the top position by means of an end ring 66 engaged in a hook 67 which is attached to the frame.

The invention also extends to means for varying the spacing of the vehicle wheels as a function of the transverse cross-section of the boat A on supports $a_1$ and $a_2$ and of the width of the roadway. It may be necessary to transport a boat of substantial width which utilizes the entire available transverse cross-section of the frame and to displace the loaded vehicle either along a relatively narrow roadway or along a normal roadway and conversely.

There is accordingly contemplated in accordance with the invention a wheel-positioning arrangement which consists in providing two symmetrical positions of the axles with respect to the upright member, namely an outer position for a normal track-width and an outer position for a narrow track-width.

FIGS. 20 and 21 show respectively in transverse cross-section and in plan the symmetrical positions I–I' and II–II' of the wheels which are designated by the reference 70 in the example under consideration.

In these figures, it is apparent that each wheel 70 rotates on an axle 71 which is mounted in overhung position at the end of a crank-arm 72, said crank-arm being pivotally mounted on a shaft 72a which is rigidly fixed to a vertical pin 73. In the most simple example of construction, said vertical pin is forcibly fitted within an upright member 74 which is rigidly fixed to a frame in accordance with the examples of construction described earlier.

If the vertical pin 73 is rigidly fixed to the upright member 74 by means of a fastening member 75 such as a bolt or locking-pin, it will only be necessary to remove said member in order to change the wheels 70 from one position to another (position I to position II and conversely).

FIGS. 22, 23 show one example of positioning which permits two wheel-spacings or track-widths without entailing any need for dismantling and tooling equipment.

In these figures, the vertical pin 73 of FIG. 20 becomes a pivot-pin 76 and this latter is rotatably mounted in a bearing 77 which is fixed parallel to the upright member 74. The pivot-pin 73 is connected by means of a shaft 72a to the crank-arm 72 which carries the axle 71 together with its wheel 70. A resilient damping device 72b provides a connection between that extremity of the crank-arm which is remote from the axle and the pivot-pin 76.

The lower portion of the bearing 77 (as shown in FIGS. 24 and 25) has a slot 77a provided with radial fins 77b, 77c, a thumb-bolt 78 being passed through said fins and screwed into an internally-threaded hole 77d of the fin 77c. By rotating the bolt 78, the fins as well as the edges of the slot 77a are drawn together, thereby clamping the bearing 77 against the pivot-pin 76.

The top portion of the bearing (shown in FIGS. 24 and 26) is pierced by two holes 77e, 77f which are aligned in parallel relation to the direction of displacement of the wheels 70 whilst a single hole 76a is pierced in the pivot-pin 76 at the level of the holes mentioned above.

The holes 76a, 77f or 76a, 77e are located in register by means of a latch-pin 80 having a restoring spring 80a and housed within a yoke 81 which rotates about the bearing 77. The latch-pin 80 is shown in FIGS. 24 and 26 in a non-engaged intermediate position. In order to latch the position corresponding to the holes 76a and 77f, the yoke 81 must be rotated in the direction of the arrow $F_1$ in order to engage the latch-pin 80 in said holes.

In order to place a wheel 70 in a symmetrical position at an angle of 180°, the latch-pin 80 is disengaged from the holes 76a, 77f and the wheel is caused to rotate so as to ensure the hole 76a of the pivot-pin comes opposite to the hole 77e. Latching is obtaind by causing the yoke 81 to rotate in the direction of the arrow $F_2$, then by releasing the latch-pin 80 which is locked within the holes 76a, 77e in register (not shown in the figure).

The embodiment of FIGS. 22 and 23 in which provision is made for a separate bearing 77 can be adapted to the embodiment of FIG. 20 by employing the upright member 74 as a bearing.

The means described in the foregoing for clamping and locking the pivot-pin 76 offer an advantage in that the wheels 70 can be changed-over very rapidly from one spacing to another without any need for disassembly.

By means of the embodiments described and when the boat A which is being transported is of a type which utilizes the entire available height of the carriage, it may be found that lateral forces are developed as a result of couples produced by the weight of the load and by the lateral reaction of the road surface, with the result that the wheels may exhibit a tendency to become outwardly displaced.

In order to overcome these lateral forces, a shaped cross-member 90 is advantageously placed between the wheels 91 and connected to the frame 92 by means of conventional bolted clamps 93. An additional support 94 placed in contact with the keel of the boat cooperates with the supports $a_1$ and $a_2$ so as to maintain the frame structure 92 in a stationary position.

It should be understood that the invention is not limited to the embodiments described in the foregoing and that many alternative modes of execution of said embodiments can be contemplated without thereby departing either from the scope or the spirit of the invention.

I claim:

1. A vehicle of the road trailer type for handling, displacing and transporting a load such as a boat which has a peripheral edge, said vehicle comprising a structure adapted to be placed above the load and to surround it, said structure comprising at least one longitudinal frame element having at least two side-members interconnected at their forward ends by means of at least one cross-member and also interconnected by at least one transverse frame element which in use is above the load, gripping means disposed at intervals along the length of said longitudinal frame element and capable of gripping the edge of the load, means on said vehicle for lifting the load, the last-named means being mounted on a said frame element, at least one wheel system for the vehicle mounted on a said transverse frame element, means for modifying the width of the longitudinal frame element as a function of the width of the load, and means for displacing the transverse frame element with respect to the longitudinal frame element and with respect to itself so as to accommodate loads of various lengths and widths.

2. A vehicle according to claim 1, wherein the wheel system comprises wheels attached each to one end of the transverse frame element, and wherein the position of said transverse frame element is adjustable in the vertical direction with respect to the side members.

3. A vehicle according to claim 1, wherein the wheel system comprises separate members each carrying at least one wheel, each of said separate members being attached to one side member and adjustable in the vertical direction with respect to the corresponding side member.

4. A vehicle according to claim 1, wherein the gripping means comprise support brackets provided with mechanical clamping means comprising a stationary shaped member and a gooseneck clamped in gripping position by means of a threaded portion and a wing-nut.

* * * * *